US012811474B2

(12) United States Patent
Kijima et al.

(10) Patent No.: US 12,811,474 B2
(45) Date of Patent: Nov. 24, 2026

(54) ENCODER AND MOTOR COMPRISING SAME

(71) Applicant: Panasonic Intellectual Property Management Co., Ltd., Osaka (JP)

(72) Inventors: Kota Kijima, Osaka (JP); Kenji Furumai, Osaka (JP); Akio Agehara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 385 days.

(21) Appl. No.: 18/580,722

(22) PCT Filed: Jun. 30, 2022

(86) PCT No.: PCT/JP2022/026184

§ 371 (c)(1),
(2) Date: Aug. 6, 2024

(87) PCT Pub. No.: WO2023/008081

PCT Pub. Date: Feb. 2, 2023

(65) Prior Publication Data

US 2025/0023431 A1 Jan. 16, 2025

(30) Foreign Application Priority Data

Jul. 28, 2021 (JP) ................................ 2021-123511

(51) Int. Cl.
*H02K 11/22* (2016.01)
*G01D 5/347* (2006.01)
*H02K 5/22* (2006.01)

(52) U.S. Cl.
CPC .......... *H02K 11/22* (2016.01); *G01D 5/3473* (2013.01); *H02K 5/22* (2013.01)

(58) Field of Classification Search
None
See application file for complete search history.

(56) References Cited

U.S. PATENT DOCUMENTS

2013/0154447 A1* 6/2013 Harada .............. G01D 5/34715 310/68 B
2015/0053040 A1* 2/2015 Ueda ....................... G01D 5/12 310/68 B
2020/0067386 A1 2/2020 Wang et al.

FOREIGN PATENT DOCUMENTS

JP 08-331810 12/1996
JP 2013113660 A * 6/2013
(Continued)

OTHER PUBLICATIONS

JP-2017106726-A machine translation (Year: 2017).*
(Continued)

*Primary Examiner* — Oluseye Iwarere
*Assistant Examiner* — Minki Chang
(74) *Attorney, Agent, or Firm* — Greenblum & Bernstein, P.L.C.

(57) ABSTRACT

An optical module is held stably. A disclosed encoder includes a rotating plate that rotates about a rotation axis, optical module including at least one of a light source that emits a light to the rotating plate and a light receiving element that receives the light reflected by the rotating plate or the light transmitted through the rotating plate, substrate on which optical module is disposed, and a frame that supports the substrate. Substrate has first mounting hole and second mounting hole, and is screwed to the frame by a first screw inserted in first mounting hole and a second screw inserted in second mounting hole. In a view in a direction along the rotation axis, optical module is disposed on first
(Continued)

line segment connecting the center of first mounting hole and the center of second mounting hole.

10 Claims, 9 Drawing Sheets

(56) References Cited

FOREIGN PATENT DOCUMENTS

| | | | | |
|---|---|---|---|---|
| JP | 2014-211347 | | | 11/2014 |
| JP | 2014-232828 | A | | 12/2014 |
| JP | 2017-106726 | | | 6/2017 |
| JP | 2017106726 | A | * | 6/2017 |

OTHER PUBLICATIONS

JP-2013113660-A machine translation (Year: 2013).*
The EPO Office Action dated Oct. 10, 2024 for the related European Patent Application No. 22849149.4.
International Search Report of PCT application No. PCT/JP2022/026184 dated Sep. 20, 2022.
The Chinese Search Report dated Mar. 13, 2026 for the related Chinese Patent Application No. 202280046463.4.

* cited by examiner

ENCODER AND MOTOR COMPRISING SAME

TECHNICAL FIELD

The present disclosure relates to an encoder and a motor including the encoder.

BACKGROUND ART

Conventionally, an encoder that detects a rotational position of a shaft of a motor is known (for example, see Patent Literature 1). The encoder disclosed in Patent Literature 1 includes a rotating plate attached to a shaft and provided with a predetermined pattern, and a main body provided with a detector that detects the predetermined pattern. The main body is fixed to a predetermined object at a fixed position at which the main body is disposed line-symmetrically, as viewed in the axial direction of the shaft, with respect to an imaginary straight line connecting a detection unit and the center of the shaft.

CITATION LIST

Patent Literature

PTL1: Unexamined Japanese Patent Publication No. 2014-211347

SUMMARY OF THE INVENTION

However, in the encoder described in Patent Literature 1, the stress produced by fixing acts unevenly on the detector, so that the detector may be held in an unstable state (for example, in a tilted state). When the detector (or an optical module) is held in such an unstable state, the detection accuracy by the encoder may be degraded. In view of such a condition, one object of the present disclosure is to hold an optical module stably.

One aspect of the present disclosure relates to an encoder. The encoder includes a rotating plate that rotates about a rotation axis, an optical module including at least one of a light source that emits a light to the rotating plate and a light receiving element that receives the light reflected by the rotating plate or the light transmitted through the rotating plate, a substrate on which the optical module is disposed, and a frame that supports the substrate. The substrate has a first mounting hole and a second mounting hole, and is screwed to the frame with a first screw inserted in the first hole and a second screw inserted in the second hole. The optical module is disposed on a first line segment connecting the center of the first mounting hole and the center of the second mounting hole as viewed in a direction along the rotation axis.

Another aspect according to the present disclosure relates to a motor. The motor includes a bracket, a shaft penetrating the bracket, and the encoder described above, where the shaft is attached to the rotating plate and rotates together with the rotating plate, and the substrate is fixed to the bracket together with the frame by the screws.

According to the present disclosure, the optical module can be held stably.

DESCRIPTION OF EMBODIMENT

Figure 1:
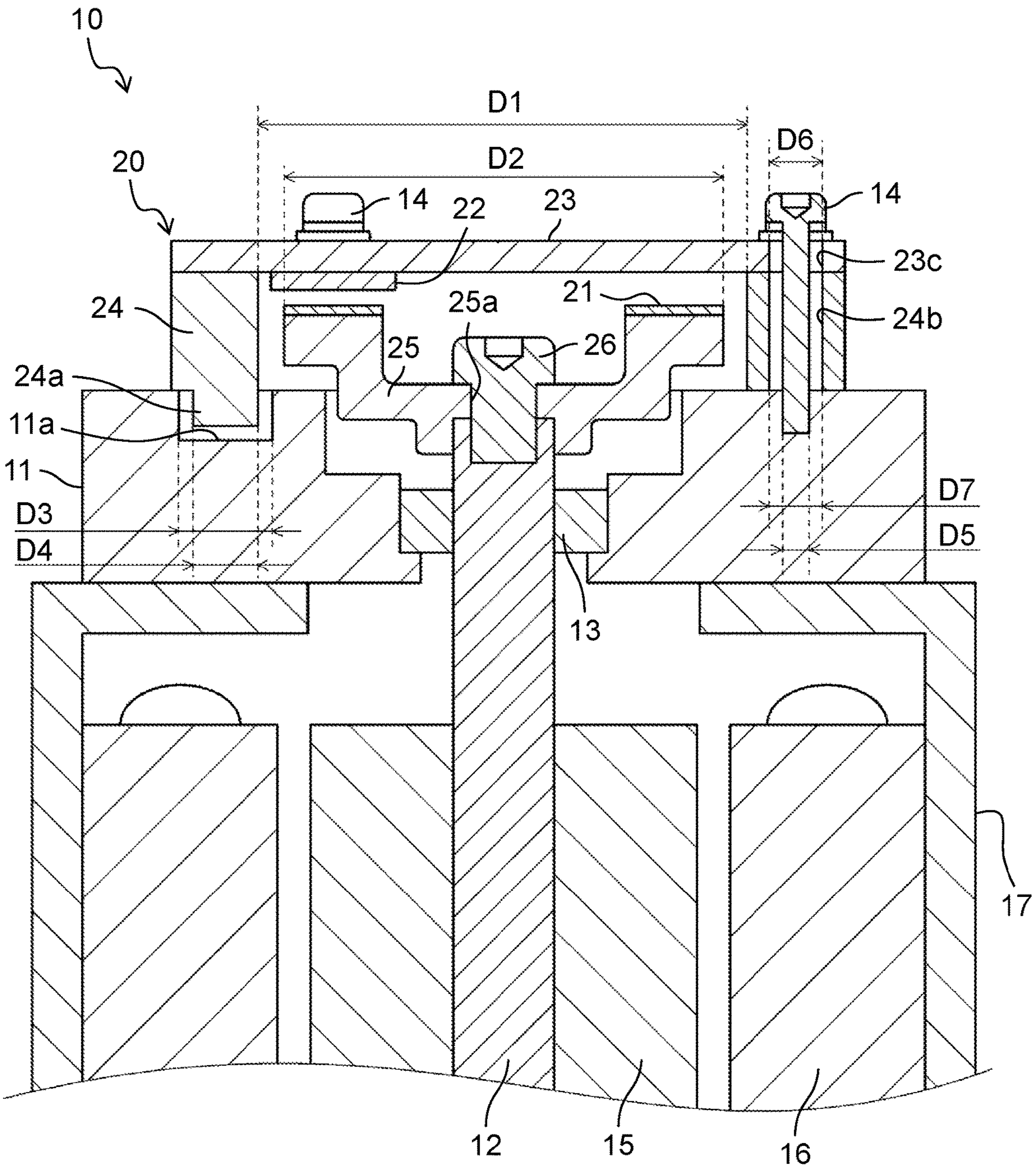
FIG. 1 is a cross-sectional view schematically illustrating a motor according to a first exemplary embodiment.

An exemplary embodiment of an encoder and a motor according to the present disclosure will be described below with reference to an example. However, the present disclosure is not limited to the example described below. Although specific numerical values and materials may be exemplarily provided in the description below, other numerical values and materials may be used as long as the effect of the present disclosure is obtained.

Encoder

An encoder according to the present disclosure includes a rotating plate, an optical module, a substrate, and a frame.

The rotating plate rotates about a rotation axis. The rotating plate may be attached to a shaft of a motor. The rotating plate may be attached directly or indirectly to the shaft. In the latter case, for example, the rotating plate is fixed to a boss fixed to the shaft. The rotating plate rotates together with the shaft about the axis of the shaft as a rotation axis. The rotating plate has a predetermined pattern formed along the circumferential direction of the rotating plate. The predetermined pattern may be a pattern used for detecting the rotational position of the shaft or a pattern used for detecting the rotational position and the rotation speed of the shaft. The rotational position of the shaft is a relative angular position or an absolute angular position of the shaft, and the rotation speed of the shaft is the number of rotations of the shaft.

The optical module includes at least one of a light source that emits a light to the rotating plate and a light receiving element. The light receiving element receives a light emitted from the light source and reflected by the rotating plate (reflected light) or a light transmitted through the rotating plate (transmitted light). In a case of the light receiving element receiving the reflected light, both the light source and the light receiving element are disposed on one side of the rotating plate. In a case of the light receiving element receiving the transmitted light, one of the light source and the light receiving element is disposed on one side of the rotating plate and the other is disposed on the other side of the rotating plate. The light receiving element may convert the received light into an electric signal. The electric signal may be used for obtaining the rotational position and the rotation speed of the shaft.

The optical module is attached to the substrate. Various electronic components may be mounted on the substrate. The substrate may be substantially disk-shaped. The term "substantially disk-shaped" means, for example, having a plate shape in which more than or equal to 80% of the outer edge is an arc.

The frame houses the rotating plate and supports the substrate such that the optical module faces the rotating plate. The frame and the substrate may be fixed to each other by predetermined fixing means. The frame may be substantially cylindrical. In other words, the frame may have therein a columnar space having a diameter larger than the diameter of the rotating plate. The rotation axis of the rotating plate is coaxial with the columnar space. The outer diameter of the frame may be identical or not identical with the outer diameter of the substrate.

The substrate described above has a first mounting hole and a second mounting hole in which screws are inserted to fix the substrate and the frame together at each position. In a view in a direction along the rotation axis of the rotating plate, the optical module is disposed on a first line segment connecting the center of the first mounting hole and the center of the second mounting hole. The optical module being disposed on the first line segment means that at least a part of the optical module overlaps the first line segment as viewed in the direction along the rotation axis of the rotating plate. According to such an arrangement, the screws inserted in the first and second mounting holes produce stress acting substantially uniformly on the optical module. This avoids tilting of the optical module, and thus the optical module can be held stably.

In a view in the direction along the rotation axis of the rotating plate, the optical module may have a substantially rectangular shape and may be divided into a first region and a second region by the first line segment, and the ratio of the area of the first region to the area of the second region may be 1:1 to 1:2. Furthermore, the ratio of the area of the first region to the area of the second region may be 1:1. By setting the ratio of the area of the first region to the area of the second region in such a value, tilting of the optical module can further be suppressed. Note that, the substantially rectangular shape includes, besides a rectangular shape, a rectangular shape with round corners.

The optical module may be positioned to overlap the midpoint of the first line segment as viewed in the direction along the rotation axis of the rotating plate. The optical module being positioned to overlap the midpoint of the first line segment means that at least a part of the optical module overlaps the midpoint as viewed in the direction along the rotation axis of the rotating plate. According to this positioning, tilting of the optical module can further be suppressed.

The substrate may further include a third mounting hole. The first mounting hole, the second mounting hole, and the third mounting hole may be positioned rotationally asymmetrically about the rotation axis of the rotating plate. According to this configuration, the relative positions, in the circumferential direction of the rotating plate, of the substrate and the frame to a mounted object (for example, a bracket) to be mounted on the substrate are determined by the first to third mounting holes and the corresponding screw holes in the mounted object. This prevents happening of an assembly error of the encoder in advance. The first to third mounting holes may be positioned rotationally symmetrically about the rotation axis of the rotating plate.

In a view looking the substrate along the rotation axis of the rotating plate, the first line segment, a second line segment connecting the center of the first mounting hole and the center of the third mounting hole, and a third line segment connecting the center of the second mounting hole and the center of the third mounting hole may form an isosceles triangle having a base angle larger than a vertex angle and having the first line segment as a base. According to this configuration, tilting of the optical module can be further suppressed by making the stress acting on the optical module further uniform. Furthermore, the optical module can be positioned far from the rotation axis of the rotating plate, and a predetermined pattern facing the optical module can be formed close to the outer edge of the rotating plate. Since it is easier to form the predetermined pattern near the outer edge than near the center of the rotating plate, the encoder can be manufactured easily.

The frame may have three through holes in which screws are inserted and provided at positions corresponding to the first to third mounting holes. In the radial direction of the rotating plate, the difference between the inner dimension of the frame and the outer dimension of the rotating plate (dimensional difference A) may be larger than the difference between the inner dimension (inner diameter, when each through hole is circular) of the three through holes and the outer dimension of the shaft portion of the screw (hereinafter, also referred to as dimensional difference D). When performing fine adjustment of the relative position of the optical module with respect to the rotating plate in assembling of the encoder, for example, the position of the substrate on which the optical module is mounted and the position of the frame are finely adjusted. In this fine adjustment, since the shaft portion of the screw is inserted in the through hole of the frame, the frame (and the substrate and the optical module) is movable in the radial direction of the rotating plate within a range in which the shaft portion of the screw does not contact the inner surface of the through hole. The magnitude relationship between dimensional difference A and dimensional difference D described above disallows the inner surface of the frame making contact with the outer edge of the rotating plate even when the frame is fully moved within the range. This suppresses damage to the rotating plate caused by the rotating plate making contact with the frame during assembling of the encoder, for example.

In the radial direction of the rotating plate, the difference between the inner dimension (or the inner diameter) of the frame and the outer dimension (or the outer diameter) of the rotating plate (hereinafter, also referred to as dimensional difference A) may be larger than the difference between the inner dimension (inner diameter when the mounting holes are circular) of the first and second mounting holes and the outer dimension (or, the outer diameter) of the shaft portion of the screw (hereinafter, also referred to as dimensional difference C). When performing fine adjustment of the relative position of the optical module with respect to the rotating plate in assembling of the encoder, for example, the position of the substrate on which the optical module is mounted and the position of the frame are finely adjusted. In this fine adjustment, the shaft portions of the screws are inserted in the mounting holes of the substrate, so that the substrate (and the frame and the optical module) is movable in the radial direction of the rotating plate within a range in which the shaft portion of the screw does not contact the inner edge of the mounting hole. The magnitude relationship between dimensional difference A and dimensional difference C described above disallows the inner surface of the frame making contact with the outer edge of the rotating plate even when the substrate is fully moved within the range. This suppresses damage to the rotating plate caused by the rotating plate making contact with the frame during assembling of the encoder, for example.

Motor

A motor according to the present disclosure includes a bracket, a shaft, and the encoder described above. The motor may include a rotor attached to the shaft and a stator facing the rotor with a gap therebetween. The motor may be, for example, an inner rotor three-phase synchronous electric motor, but is not limited thereto.

The bracket is a member to which the encoder is attached. The substrate of the encoder is fixed to the bracket by screws together with the frame.

The shaft penetrates the bracket. The shaft is attached to the rotating plate of the encoder and rotates together with the rotating plate.

As described above, according to the present disclosure, the optical module can be held stably and degrading of detection accuracy of the encoder can be avoided.

Hereinafter, an example of the encoder and the motor according to the present disclosure will be specifically described with reference to the drawings. The components described above can be used as components of the encoder and the motor of the example described below. The components of the encoder and the motor of the example described below can be altered based on the above description. Moreover, a matter described below may be applied to the exemplary embodiment described above. Among the components of the encoder and the motor of the example described below, components that are not essential to the encoder and the motor according to the present disclosure may be omitted. Note that, the following drawings are schematic and do not accurately reflect the shape, dimension, number, or the like of actual members.

First Exemplary Embodiment

A first exemplary embodiment of the present disclosure will be described. Motor 10 of the present exemplary embodiment is an inner rotor three-phase synchronous electric motor, but is not limited thereto.

FIG. 1 is a cross-sectional view schematically illustrating motor 10 according to the present exemplary embodiment. As illustrated in FIG. 1, motor 10 includes shaft 12, rotor 15, stator 16, case 17, and encoder 20 having bracket 11.

Shaft 12 penetrates bracket 11 and is rotatably supported by bracket 11 via bearing 13. Rotating plate 21 (described later) of encoder 20 is attached to shaft 12, and rotating plate 21 rotates together with shaft 12.

Rotor 15 is attached to shaft 12. Rotor 15 rotates together with shaft 12. Rotor 15 of the present exemplary embodiment is an interior magnet rotor, but is not limited thereto.

Stator 16 faces rotor 15 with an air gap therebetween. Stator 16 is provided in the outer side, in the radial direction of motor 10, of rotor 15. Stator 16 of the present exemplary embodiment is a concentrated winding stator, but is not limited thereto.

Case 17 is a hollow cylindrical member. Case 17 is coupled to bracket 11 and houses rotor 15 and stator 16. Stator 16 is fixed to an inner surface of case 17. Case 17 is made of a non-magnetic material (for example, aluminum or an aluminum alloy). In the present exemplary embodiment, case 17 and bracket 11 are separate parts, but may be integrally formed.

Encoder 20 of the present exemplary embodiment is a multiturn absolute encoder, but is not limited thereto. Encoder 20 of the present exemplary embodiment is a battery encoder, but may be a battery-less encoder including a permanent magnet and a power generating element. As illustrated in FIG. 1, encoder 20 includes bracket 11, rotating plate 21, optical module 22, substrate 23, and frame 24. Encoder 20 may not include bracket 11, but also in such a case, bracket 11 is a component of motor 10.

Bracket 11 is a member for attaching encoder 20 to case 17. A through hole is formed at the center of bracket 11, and shaft 12 passes through the through hole. Bearing 13 that rotatably supports shaft 12 is fixed to an inner surface of the through hole. Bracket 11 houses, with case 17, rotor 15 and stator 16.

Rotating plate 21 is attached to shaft 12 of motor 10 via boss 25. The outer shape of rotating plate 21 is substantially circular. Boss 25 is fixed to shaft 12 by bolt 26 inserted in bolt hole **25*a*. Rotating plate 21 rotates together with shaft 12 about the axis of shaft 12** as a rotation axis.

Figure 5:
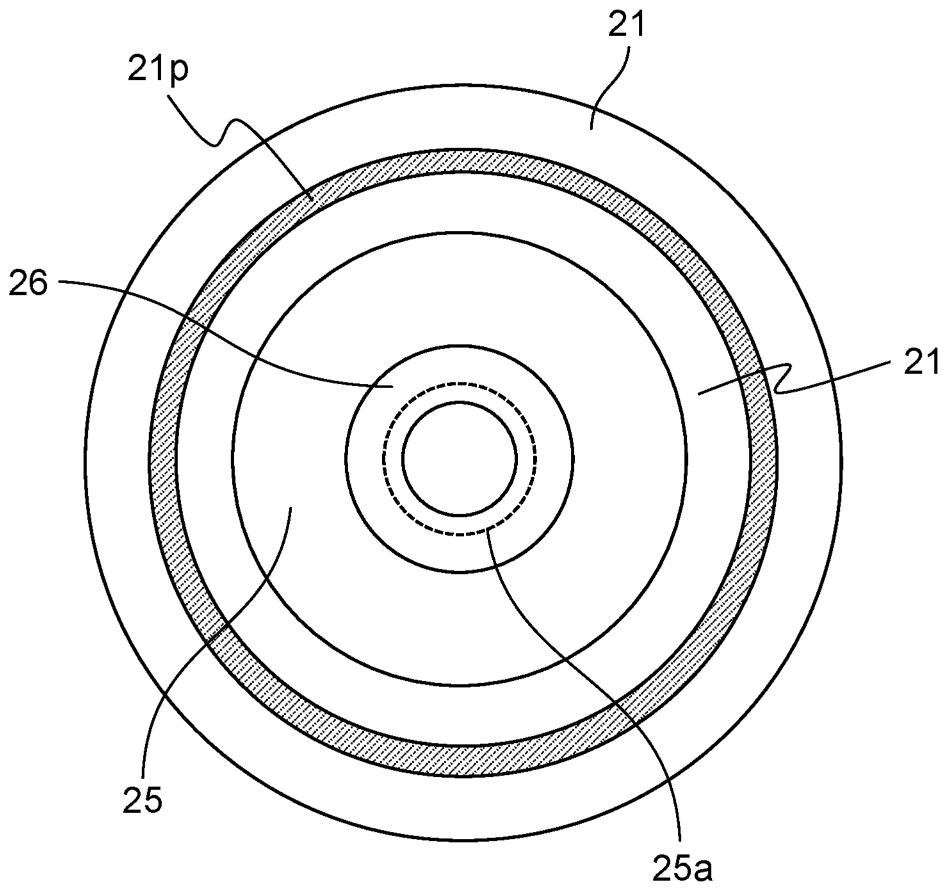
FIG. 5 is a view illustrating an upper surface of the rotating plate of the motor according to the first exemplary embodiment as viewed from the substrate.

FIG. 5 is a view illustrating an upper surface of rotating plate 21 of motor 10 according to the present exemplary embodiment as viewed from substrate 23. As illustrated in FIG. 5, rotating plate 21 has predetermined pattern **21*p* formed along the circumferential direction of rotating plate 21. Predetermined pattern 21*p* is used for detecting the rotational position and the rotational speed of shaft 12. Predetermined pattern 21*p*** may be, for example, a pattern such as a barcode and a QR code (registered trademark).

Figure 6:
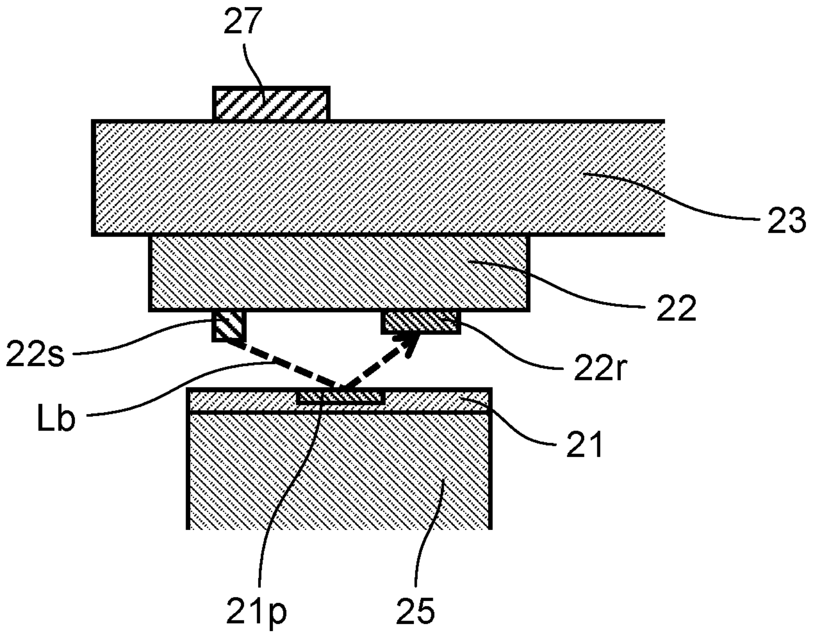
FIG. 6 is a cross-sectional view schematically illustrating an arrangement relationship among an optical module, the substrate, and the rotating plate included in the motor according to the first exemplary embodiment.
Figure 7:
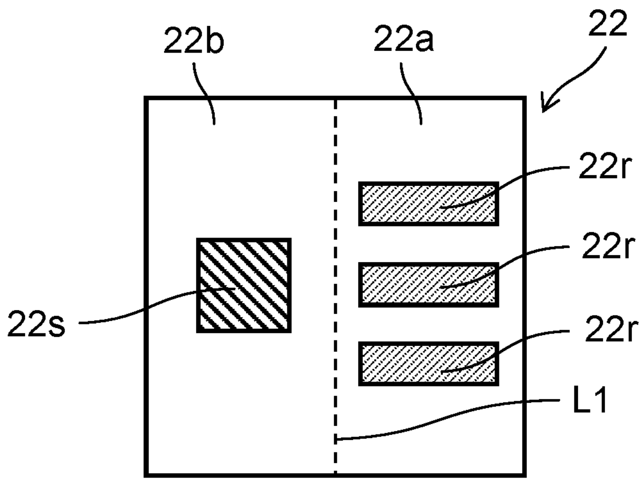
FIG. 7 is a plan view illustrating an arrangement of a light source and a light receiving element of the optical module included in the motor according to the first exemplary embodiment.

FIG. 6 is a cross-sectional view schematically illustrating an arrangement relationship among optical module 22, substrate 23, and rotating plate 21 of motor 10 according to the present exemplary embodiment. FIG. 7 is a plan view illustrating an arrangement of light source **22*s* and light receiving element 22*r* of optical module 22. As illustrated in FIG. 6, optical module 22 includes light source 22*s* (for example, an LED (light emitting diode)) that emits a light to rotating plate 21 and light receiving element 22*r* (for example, a photodiode). Note that, a plurality of light receiving elements 22*r* each having a rectangular shape are arrange such that their long sides of rectangles are parallel with each other. Optical module 22 has a substantially rectangular shape in a view in a direction along the rotation axis of rotating plate 21 (the up-down direction in FIG. 1, which is hereinafter simply referred to as axial direction) as illustrated in FIG. 7 to be described later, but the shape of optical module 22 is not particularly limited. The substantially rectangular shape includes, besides a rectangular shape, a rectangular shape with round corners. Light receiving element 22***r* of the present exemplary embodiment receives light Lb emitted from light source 22*s* and reflected by rotating plate 21. It may be configured that the light receiving element 22*r* receives the light emitted from the light source 22*s* and transmitted through the rotating plate 21. When it is configured that light receiving element 22*r* receives the light transmitted through rotating plate 21, the light source may be disposed below rotating plate 21 in FIG. 1. The light receiving element converts the received light into an electric signal. The electric signal is used for obtaining the rotational position and the rotation speed of shaft 12. The configuration in which optical module 22 includes both light source 22*s* and light receiving element 22*r* is illustrated in the example in FIG. 6, but optical module 22 is required to include either light source 22*s* or light receiving element 22*r*. For example, optical module 22 may include light receiving element 22*r*, and light source 22*s* may be directly provided on substrate 23.

Optical module 22 is attached to substrate 23. Various electronic components 27 are mounted on substrate 23.

Figure 2:
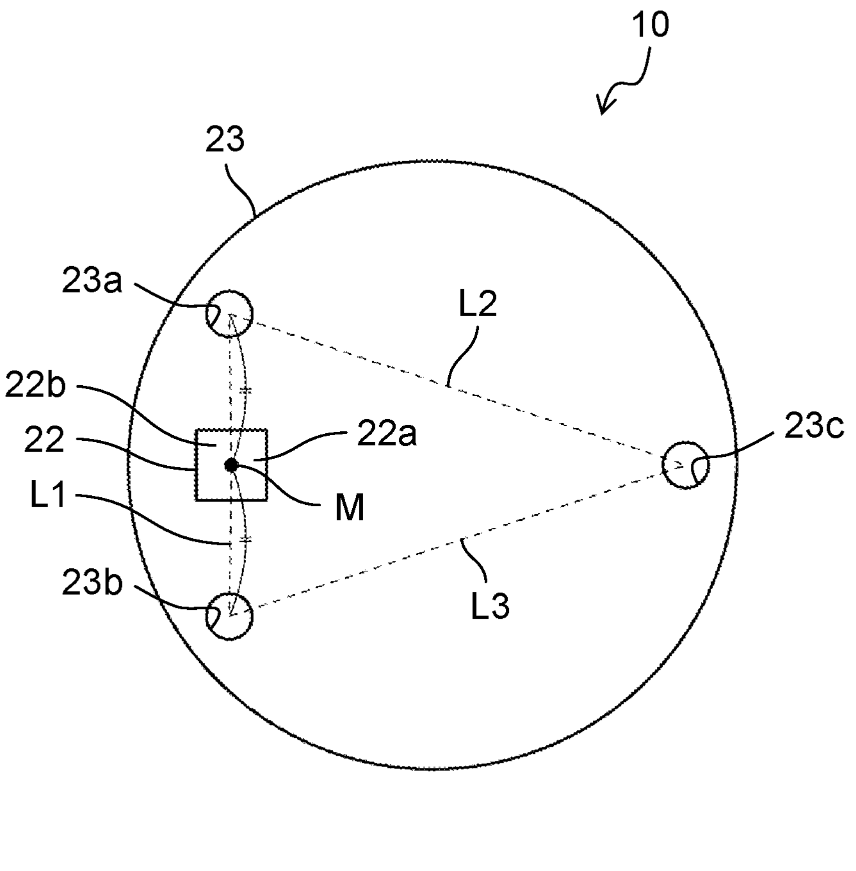
FIG. 2 is a schematic view of a substrate of the motor according to the first exemplary embodiment as viewed from a rotating plate.

FIG. 2 is a schematic view of substrate 23 of motor 10 according to the present exemplary embodiment as viewed from rotating plate 21. As illustrated in FIG. 2, substrate 23 is substantially disk-shaped and has first mounting hole 23*a*, second mounting hole 23*b*, and third mounting hole 23*c*. Screws 14 (or, bolts) for attaching substrate 23 to bracket 11 together with frame 24 are inserted in first mounting hole 23*a* to third mounting hole 23*c* as indicated by a portion in FIG. 1 including third mounting hole 23*c*. Screws 14 fix together substrate 23 and frame 24 at each position. That is, the relative positional relationship between screw 14 and bracket 11 is fixed. First mounting hole 23*a* to third mounting hole 23*c* are substantially circular and penetrate substrate 23 in the thickness direction thereof. The term "substantially circular" means, for example, having a shape in which more than or equal to 80% of the outer edge is an arc.

Optical module 22 is positioned to overlap midpoint M of first line segment L1 connecting the center of first mounting hole 23*a* and the center of second mounting hole 23*b* as viewed in the axial direction. Optical module 22 is divided into first region 22*a* and second region 22*b* by first line segment L1. The ratio of the area of first region 22*a* to the area of second region 22*b* is 1:1. In the present exemplary embodiment, a center point (an intersection of two diagonal lines) of rectangular optical module 22 is on midpoint M of first line segment L1 as viewed in the axial direction. However, it is required that at least a part of optical module 22 overlaps first line segment L1 as viewed in the axial direction. With this arrangement, tilting of optical module 22 can be suppressed, and optical module 22 can be held stably. The distance between the center point of optical module 22 and midpoint M of first line segment L1 may be, for example, less than or equal to 5 mm.

First line segment L1 described above, second line segment L2 connecting the center of first mounting hole 23*a* and the center of third mounting hole 23*c*, and third line segment L3 connecting the center of second mounting hole 23*b* and the center of third mounting hole 23*c* form an isosceles triangle having a base angle larger than a vertex angle and having first line segment L1 as a base. As described above, first mounting hole 23*a* to third mounting hole 23*c* are positioned rotationally asymmetrically about the rotation axis of rotating plate 21.

Frame 24 is fixed to bracket 11. Frame 24 may be substantially cylindrical. Frame 24 houses rotating plate 21 and supports substrate 23 such that optical module 22 faces rotating plate 21 (more specifically, a region of rotating plate 21 where the predetermined pattern is formed). Substrate 23 is fixed to frame 24 by predetermined fixing means. Specifically, substrate 23 is fixed to frame 24 by screws 14.

Note that, in fixing substrate 23 to frame 24, for example, pins included in frame 24 may be press-fitted into pin holes formed in substrate 23 to fix together substrate 23 and frame 24.

Figure 3:
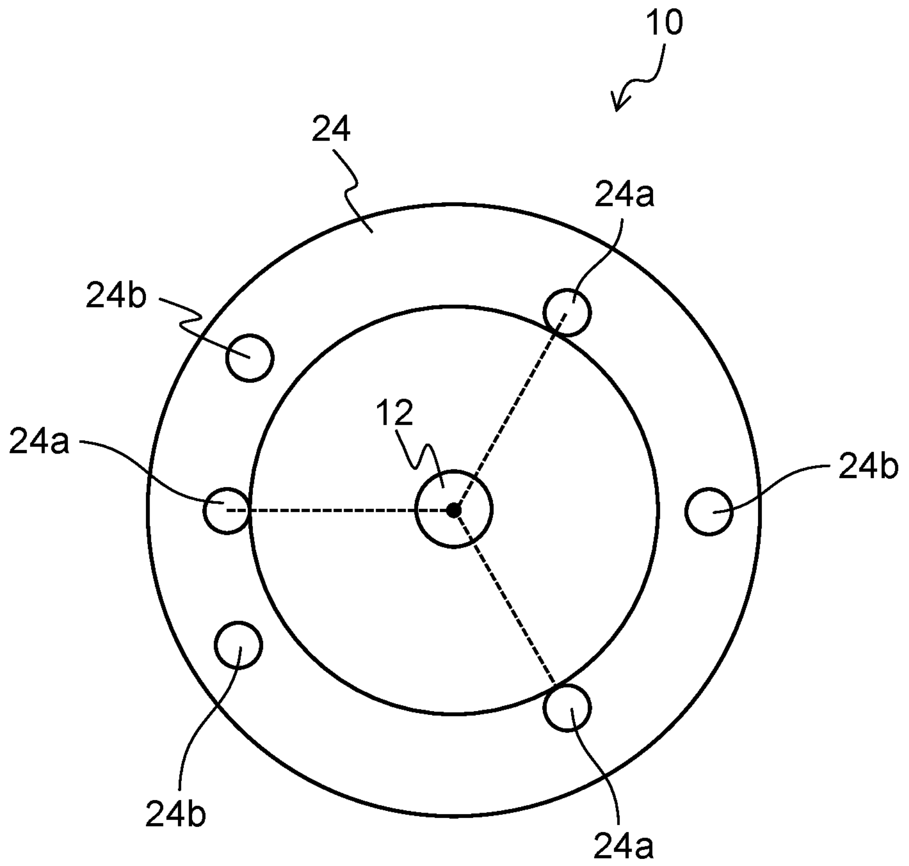
FIG. 3 is a schematic view illustrating a frame of the motor according to the first exemplary embodiment as viewed from a case.

FIG. 3 is a schematic view illustrating frame 24 of motor 10 according to the present exemplary embodiment as viewed from case 17. As illustrated in FIG. 3, frame 24 has three through holes 24*b* in which screws 14 described above are inserted. Three through holes 24*b* are provided at positions corresponding to first mounting hole 23*a* to third mounting hole 23*c* of substrate 23. Inner dimension D7 of each through hole 24*b* is substantially equal to, but may be different from, inner dimension D6 of each of first mounting hole 23*a* to third mounting hole 23*c* of substrate 23. Each through hole 24*b* penetrates frame 24 in the thickness direction thereof (the up-down direction in FIG. 1). Frame 24 and substrate 23 are fixed to bracket 11 by screws 14.

Bracket 11 has three recesses 11*a* in a surface facing frame 24 (upper surface in FIG. 1). Three recesses 11*a* are recessed in the axial direction. Three recesses 11*a* are disposed at a constant interval (at 120° interval) in the circumferential direction of motor 10. Each recess 11*a* is substantially circular. Each recess 11*a* may have any shape such as an elliptical shape, a rectangular shape, and a polygonal shape.

Frame 24 has three protrusions 24*a* at positions corresponding to three recesses 11*a*, and each protrusion 24*a* enters recess 11*a* of bracket 11 with a gap therebetween (gap in the radial direction of rotating plate 21). Three protrusions 24*a* protrude in the axial direction. Three protrusions 24*a* are disposed at a constant interval (at 120° interval) in the circumferential direction of frame 24. Each protrusion 24*a* is substantially circular. Each protrusion 24*a* may have any shape such as an elliptical shape, a rectangular shape, and a polygonal shape.

As illustrated in FIG. 1, in the radial direction of rotating plate 21 (the left-right direction in FIG. 1, which is hereinafter also simply referred to as radial direction), the difference between inner dimension D1 of frame 24 and outer dimension D2 of rotating plate 21 (dimensional difference A) is larger than the difference between inner dimension D3 of recess 11*a* of bracket 11 and outer dimension D4 of protrusion 24*a* of frame 24 (hereinafter, also referred to as dimensional difference B). Dimensional difference B corresponds to the maximum value of the movable distance of protrusion 24*a* relative to recess 11*a*. For example, dimensional difference A may be from 2 mm to 3 mm inclusive, and dimensional difference B may be from 0.5 mm to 1.5 mm inclusive. Inner dimension D1 of frame 24 is larger than outer dimension D2 of rotating plate 21 (D1>D2), and inner dimension D3 of recess 11*a* is larger than outer dimension D4 of protrusion 24*a* (D3>D4).

In the radial direction, dimensional difference A is larger than the difference between inner dimension D6 of first mounting hole 23*a* of substrate 23 and outer dimension D5 of the shaft portion of screw 14 (dimensional difference C). Dimensional difference C corresponds to the maximum value of the movable distance of substrate 23 relative to screw 14. For example, dimensional difference C may be from 0.5 mm to 1.5 m inclusive. Inner dimension D6 of first mounting hole 23*a* is larger than outer dimension D5 of the shaft portion of screw 14 (D6>D5).

Furthermore, in the radial direction, dimensional difference A is larger than the difference between inner dimension D7 of through hole 24*b* of frame 24 and outer dimension D5 of the shaft portion of screw 14 (dimensional difference D). Dimensional difference D corresponds to the maximum value of the movable distance of frame 24 relative to screw 14. For example, dimensional difference D may be from 0.5 mm to 1.5 mm inclusive. Inner dimension D7 of through hole 24*b* is larger than outer dimension D5 of the shaft portion of screw 14 (D7>D5).

The following advantages are obtained by the magnitude relationship among dimensional difference A and dimensional differences B to D described above. That is, when performing fine adjustment of the relative position of optical module 22 with respect to rotating plate 21 in assembling of encoder 20, for example, the position of substrate 23 on which optical module 22 is mounted and the position of frame 24 are finely adjusted. In this fine adjustment, the movement ranges of frame 24 and substrate 23 in the radial direction with respect to rotating plate 21 are limited by physical interference between members among which relatively small dimensional differences B to D exist (for example, between frame 24 having protrusion 24*a* and bracket 11 having recess 11*a*). In this limited movement range, no physical interference occurs between frame 24 and rotating plate 21 between which a relatively large dimensional difference A exists. This suppresses damage to rotating plate 21 caused by rotating plate 21 making contact with frame 24 during assembling of encoder 20, for example.

Positions where light source 22*s* and light receiving element 22*r* are disposed on optical module 22 will be described below with reference to FIG. 7. FIG. 7 is a plan view of optical module 22 of motor 10 according to the present exemplary embodiment as viewed from rotating plate 21.

Optical module 22 is divided into first region 22*a* and second region 22*b* by first line segment L1. A plurality of light receiving elements 22*r* are disposed in first region 22*a*, and light source 22*s* is disposed in second region 22*b*. A plurality of light receiving elements 22*r* each have a rectangular shape, and are arrange such that their long sides of rectangle are parallel with each other. In this way, tilting of optical module 22 can be suppressed and optical module 22 can be held stably, since optical module 22 is disposed such that at least a part of optical module 22 overlaps first line segment L1 as viewed in the axial direction.

Note that, in FIG. 7, a plurality of light receiving elements 22*r* are arranged such that the long sides thereof are parallel to first line segment L1, but the present invention is not limited to this arrangement. For example, a plurality of light receiving elements 22*r* may be arranged such that the long sides thereof are perpendicular to the first line segment. In addition, in the example in FIG. 7, optical module 22 includes three light receiving elements 22*r*, but the number of light receiving elements 22*r* is not limited to three. Two or four or more light receiving elements may be included. Optical module 22 includes a plurality of light receiving elements 22*r* in order to obtain the rotation position and the rotation speed of shaft 12 with high accuracy by emitting a light by light source 22*s* across a plurality of light receiving elements 22*r*. A plurality of light receiving elements 22*r* have the same shape, but may have different shapes, or alternatively, two of them may have the same shape and the rest may have a different shape. Furthermore, when only the light intensity of light source 22*s* is to be obtained, a single light receiving element 22*r* may be provided.

First Exemplary Arrangement of Optical Module

Figure 8:
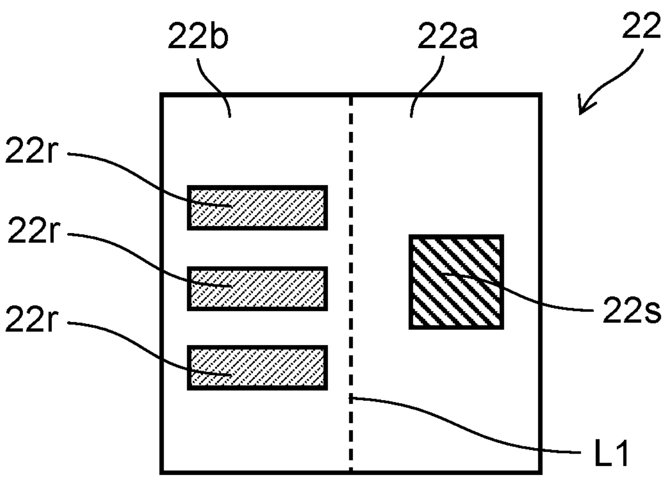
FIG. 8 is a plan view illustrating an arrangement, according to a first exemplary arrangement, of the light source and the light receiving element of the optical module included in the motor according to the first exemplary embodiment.

FIG. 8 illustrates a first exemplary arrangement of optical module 22. FIG. 8 is a plan view illustrating an arrangement, according to the first exemplary arrangement, of light source 22*s* and light receiving elements 22*r* of optical module 22 included in motor 10 according to the present exemplary embodiment. On optical module 22 in this example, light source 22*s* is disposed in first region 22*a* and a plurality of light receiving elements 22*r* are arranged in second region 22*b*. In this way, tilting of optical module 22 can be suppressed and optical module 22 can be held stably, since optical module 22 is disposed such that at least a part of optical module 22 overlaps first line segment L1 as viewed in the axial direction.

Second Exemplary Arrangement of Optical Module

Figure 9:
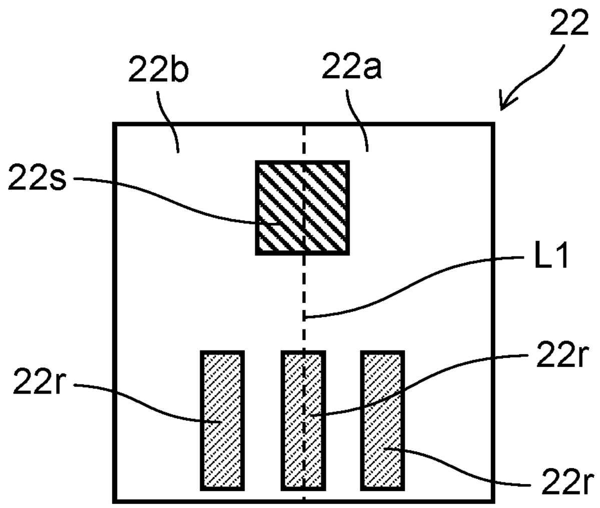
FIG. 9 is a plan view illustrating an arrangement, according to a second exemplary arrangement, of the light source and the light receiving element of the optical module included in the motor according to the first exemplary embodiment.

FIG. 9 illustrates a second exemplary arrangement of optical module 22. FIG. 9 is a plan view illustrating an arrangement, according to the second exemplary arrangement, of light source 22*s* and light receiving elements 22*r* of optical module 22 included in motor 10 according to the present exemplary embodiment. On optical module 22 in the second exemplary arrangement, light source 22*s* and a plurality of light receiving elements 22*r* are disposed on first line segment L1. In this way, tilting of optical module 22 can be suppressed and optical module 22 can be held stably, since optical module 22 is disposed such that at least a part of optical module 22 overlaps first line segment L1 as viewed in the axial direction.

Third Exemplary Arrangement of Optical Module

Figure 10:
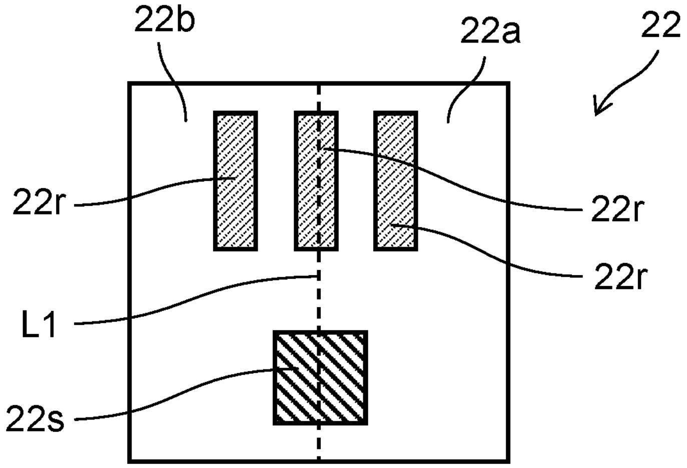
FIG. 10 is a plan view illustrating an arrangement, according to a third exemplary arrangement, of the light source and the light receiving element of the optical module included in the motor according to the first exemplary embodiment.

FIG. 10 illustrates a third exemplary arrangement of optical module 22. FIG. 10 is a plan view illustrating an arrangement, according to the third exemplary arrangement, of light source 22*s* and a plurality of light receiving elements 22*r* of optical module 22 included in motor 10 according to the present exemplary embodiment. On optical module 22 in the third exemplary arrangement, light source 22*s* and light receiving element 22*r* are disposed on first line segment L1. In this way, tilting of optical module 22 can be suppressed and optical module 22 can be held stably, since optical module 22 is disposed such that at least a part of optical module 22 overlaps first line segment L1 as viewed in the axial direction.

First Exemplary Modification

An exemplary modification of optical module 22 and the arrangement of elements near optical module 22 of the present exemplary embodiment will be described below. More specifically, an example in which light receiving element 22*r* receives light Lb emitted from light source 22*s* and transmitted through rotating plate 21 will be described.

Figure 11:
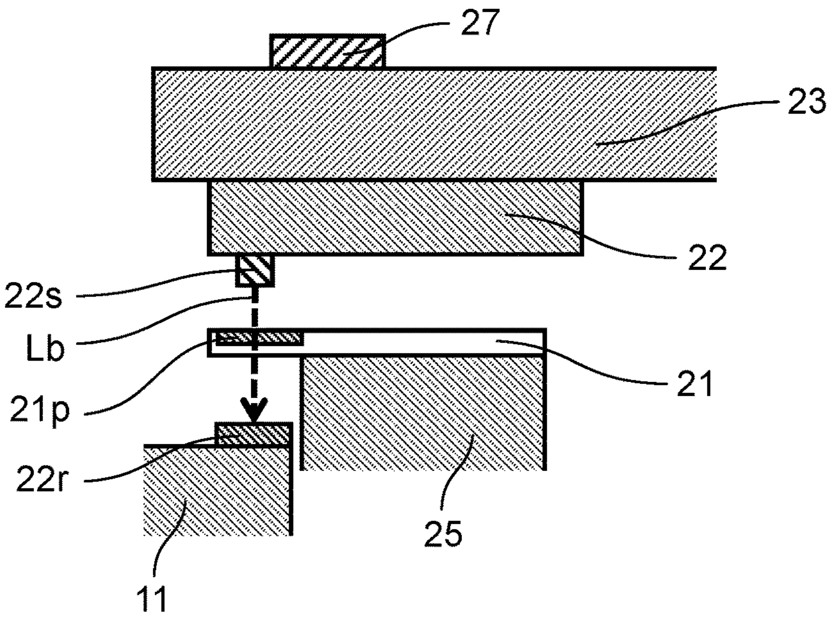
FIG. 11 is a cross-sectional view schematically illustrating an arrangement relationship, according to a first exemplary modification, among the optical module, the substrate, and the rotating plate of the motor according to the first exemplary embodiment.

FIG. 11 is a cross-sectional view schematically illustrating an arrangement relationship, according to a first exemplary modification, among optical module 22, substrate 23, and rotating plate 21 included in motor 10 according to the present exemplary embodiment. In the first exemplary modification, light source 22*s* is fixed to optical module 22, and light receiving element 22*r* is fixed to bracket 11. Light Lb emitted from light source 22*s* is transmitted through pattern 21*p* provided on rotating plate 21 and is incident on light receiving element 22*r*. The rotation speed and the rotation angle of rotating plate 21 can be read by light receiving element 22*r* reading the pattern obtained by light Lb transmitting through pattern 21*p*.

Second Exemplary Modification

Figure 12:
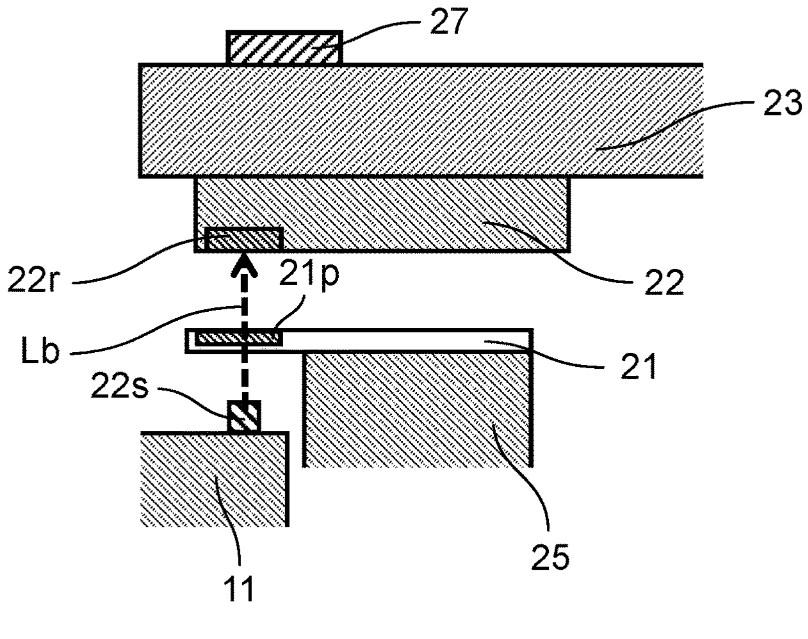
FIG. 12 is a cross-sectional view schematically illustrating an arrangement relationship, according to a second exemplary modification, among the optical module, the substrate, and the rotating plate of the motor according to the first exemplary embodiment.

FIG. 12 is a cross-sectional view schematically illustrating an arrangement relationship, according to a second exemplary modification, among optical module 22, substrate 23, and rotating plate 21 included in motor 10 according to the present exemplary embodiment. In the second exemplary modification, light receiving element 22*r* is fixed to optical module 22, and light source 22*s* is fixed to bracket 11. Light Lb emitted from light source 22*s* is transmitted through pattern 21*p* provided on rotating plate 21 and is incident on light receiving element 22*r*. The rotation speed and the rotation angle of rotating plate 21 can be read by light receiving element 22*r* reading the pattern obtained by light Lb transmitting through pattern 21*p*.

Second Exemplary Embodiment

A second exemplary embodiment of the present disclosure will be described. The present exemplary embodiment is different from the first exemplary embodiment described above in the arrangement of optical module 22 and the like on substrate 23. Other configurations are the same as those of the first exemplary embodiment. Hereinafter, points different from the first exemplary embodiment will be mainly described.

Figure 4:
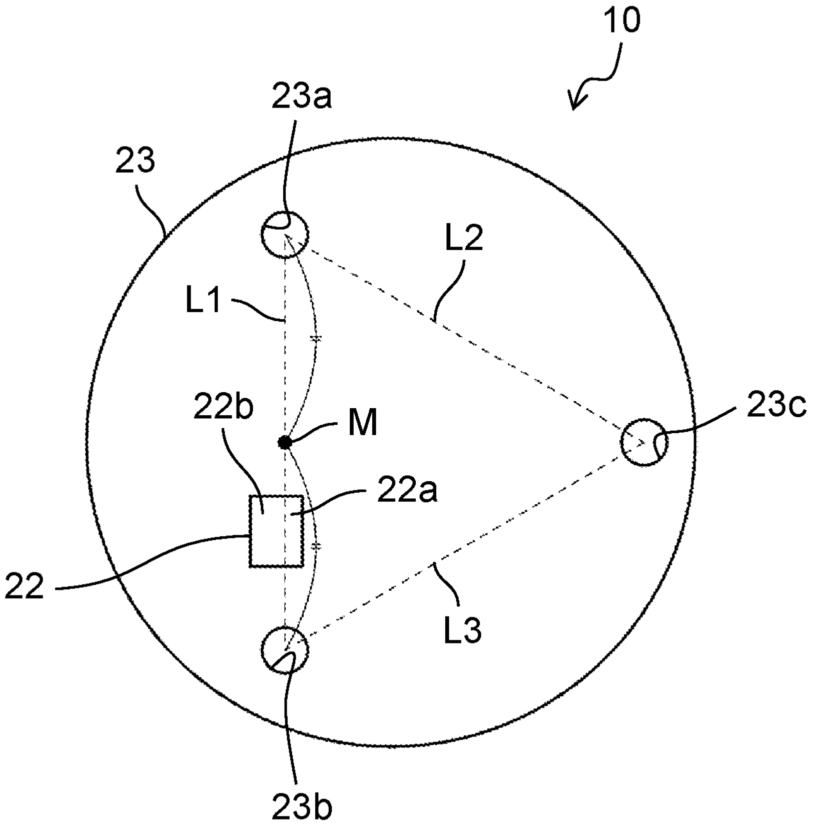
FIG. 4 is a schematic view of a substrate of a motor according to a second exemplary embodiment as viewed from a rotating plate.

FIG. 4 is a schematic view of substrate 23 of motor 10 according to the present exemplary embodiment as viewed from rotating plate 21. As illustrated in FIG. 4, as viewed in the axial direction, optical module 22 is disposed on first line segment L1, but is not positioned to overlap midpoint M of first line segment L1. Furthermore, in optical module 22, the ratio of the area of first region 22*a* to the area of second region 22*b* is 1:2. Even when optical module 22 is not positioned to overlap midpoint M of first line segment L1 as viewed in the axial direction described above, or even when the center point of optical module 22 is not on first line segment L1, the effect of the present disclosure can be obtained.

Furthermore, first mounting hole 23*a* to third mounting hole 23*c* are positioned rotationally symmetrically about the rotation axis of rotating plate 21. More specifically, first mounting hole 23*a* to third mounting hole 23*c* are disposed on the same circle centered on the axial center of shaft 12 and at a constant interval (at 120° interval) in the circumferential direction of substrate 23. Thus, in the present exemplary embodiment, first line segment L1, second line segment L2, and third line segment L3 form an equilateral triangle.

INDUSTRIAL APPLICABILITY

The present disclosure can be used for an encoder and a motor including the encoder.

The invention claimed is:

1. An encoder comprising:

a rotating plate that rotates about a rotation axis, the rotating plate being attached to a shaft;

a bracket supporting the shaft;

an optical module including at least one of a light source that emits a light to the rotating plate and a light receiving element that receives the light reflected by the rotating plate or the light transmitted through the rotating plate;

a substrate on which the optical module is disposed; and a frame that supports the substrate, wherein the substrate includes a first mounting hole and a second mounting hole, and is screwed to the frame by a first screw inserted in the first mounting hole and a second screw inserted in the second mounting hole, the optical module is disposed on a first line segment connecting a center of the first mounting hole and a center of the second mounting hole as viewed in a direction along the rotation axis, the bracket has a plurality of recesses in a face facing the frame, the plurality of recesses being recessed in the axial direction, the axial direction being a direction along the rotation axis of the rotating plate, and the frame has a plurality of protrusions at positions corresponding to the plurality of recesses, each of the plurality of protrusions being configured to enter the plurality of recesses with gaps therebetween.

2. The encoder according to claim 1, wherein in a view in the direction along the rotation axis, the optical module has a substantially rectangular shape and is divided into a first region and a second region by the first line segment, and a ratio of an area of the first region to an area of the second region is 1:1 to 1:2.

3. The encoder according to claim 2, wherein the ratio of the area of the first region to the area of the second region is 1:1.

4. The encoder according to claim 1, wherein the optical module is positioned to overlap a midpoint of the first line segment in a view in the direction along the rotation axis.

5. The encoder according to claim 1, wherein the substrate further includes a third mounting hole, and the first mounting hole, the second mounting hole, and the third mounting hole are positioned rotationally asymmetrically about the rotation axis.

6. The encoder according to claim 5, wherein in a view looking the substrate along the rotation axis, the first line segment, a second line segment connecting the center of the first mounting hole and a center of the third mounting hole, and a third line segment connecting the center of the second mounting hole and the center of the third mounting hole form an isosceles triangle having a base angle larger than a vertex angle and having the first line segment as a base.

7. The encoder according to claim 5, wherein the frame has three through holes which are provided at positions corresponding to the first mounting hole, the second mounting hole, and the third mounting hole, the screw being inserted in a corresponding one of the three through holes, and in a radial direction of the rotating plate, a difference between an inner dimension of the frame and an outer dimension of the rotating plate is larger than a difference between an inner dimension of the three through holes and an outer dimension of a shaft portion of the screw.

8. The encoder according to claim 1, wherein in the radial direction of the rotating plate, the difference between the inner dimension of the frame and the outer dimension of the rotating plate is larger than a difference between an inner dimension of the first mounting hole and the second mounting hole and the outer dimension of the shaft portion of the screw.

9. A motor comprising:

the bracket;

the shaft penetrating the bracket; and the encoder according to claim 1, wherein the shaft is attached to the rotating plate and rotates together with the rotating plate, and the substrate is fixed to the bracket together with the frame by the screw.

10. The encoder according to claim 1, wherein the plurality of recesses are disposed at a constant interval in the circumferential direction of the motor.

* * * * *